(12) United States Patent
Pisinger

(10) Patent No.: US 8,597,131 B2
(45) Date of Patent: Dec. 3, 2013

(54) DRIVESHAFT INSERT AND DRIVESHAFT MECHANISM

(75) Inventor: Bernhard Pisinger, Menasha, WI (US)

(73) Assignee: Machine Service, Inc., Green Bay, WI (US)

( * ) Notice: Subject to any disclaimer, the term of this patent is extended or adjusted under 35 U.S.C. 154(b) by 0 days.

(21) Appl. No.: 13/462,586

(22) Filed: May 2, 2012

(65) Prior Publication Data

US 2013/0294824 A1 Nov. 7, 2013

(51) Int. Cl.
*F16C 1/22* (2006.01)
(52) U.S. Cl.
USPC ........... 464/162; 464/181; 156/60; 29/DIG. 1
(58) Field of Classification Search
USPC ............ 464/162, 181, 182; 403/109.1, 359.1, 403/360; 156/60; 29/DIG. 1
See application file for complete search history.

(56) References Cited

U.S. PATENT DOCUMENTS

| | | | |
|---|---|---|---|
| 2,198,654 A | 4/1940 | Calkins et al. | |
| 3,889,780 A | 6/1975 | Dison | |
| 3,942,336 A | 3/1976 | Schultenkamper | |
| 4,089,190 A | 5/1978 | Worgan et al. | |
| 4,173,128 A | 11/1979 | Corvelli | |
| 4,259,382 A | 3/1981 | Schwan | |
| 4,279,275 A | 7/1981 | Stanwood et al. | |
| 4,663,819 A | 5/1987 | Traylor | |
| 4,664,644 A * | 5/1987 | Kumata et al. ............ 464/181 X |
| 4,952,195 A | 8/1990 | Traylor | |
| 5,230,661 A | 7/1993 | Schreiber et al. | |
| 5,253,947 A | 10/1993 | Petrzelka et al. | |
| 5,525,112 A | 6/1996 | Smith | |
| 5,558,456 A * | 9/1996 | Nakase et al. ............ 403/359.1 |
| 5,601,494 A | 2/1997 | Duggan | |
| 5,634,853 A | 6/1997 | Smith | |
| 5,655,968 A | 8/1997 | Burton | |
| 5,716,276 A | 2/1998 | Mangas et al. | |
| 5,853,177 A | 12/1998 | Brissette et al. | |
| 6,193,612 B1 | 2/2001 | Craig et al. | |
| 6,234,907 B1 * | 5/2001 | Moser .................... 403/359.1 X |
| 6,554,714 B2 | 4/2003 | Kurecka et al. | |
| 6,840,865 B2 | 1/2005 | Lentini et al. | |
| 7,007,362 B2 | 3/2006 | Gibson | |
| 7,338,380 B2 | 3/2008 | Byerly et al. | |
| 7,485,045 B2 | 2/2009 | Williams | |
| 7,731,593 B2 | 6/2010 | Dewhirst et al. | |

FOREIGN PATENT DOCUMENTS

JP 5060122 3/1993

* cited by examiner

*Primary Examiner* — Gregory Binda
(74) *Attorney, Agent, or Firm* — Reinhart Boerner Van Deuren, s.c.

(57) ABSTRACT

A driveshaft mechanism tiding a driveshaft insert and a driveshaft are provided. The driveshaft insert is coupled to the driveshaft. The driveshaft insert is configured to couple with a component such that the driveshaft and the component rotate together.

13 Claims, 5 Drawing Sheets

DRIVESHAFT INSERT AND DRIVESHAFT MECHANISM

BACKGROUND OF THE INVENTION

The present invention relates generally to the field of driveshafts. The present invention relates more particularly to an insert for interfacing a driveshaft with another component.

Driveshafts may be used to transmit power from one point to another. For example, in heavy vehicles or other motor vehicles a driveshaft may be used to transmit torque from a transmission to an axle. In such an application, a driveshaft may be subject to torsion and shear forces. Driveshafts in motor vehicles may be interfaced with various parts, e.g., transmission, axle, etc., to allow power to be transmitted from one component to another. Driveshafts may be used in various applications where it may be useful to interface the driveshaft and a component such that the driveshaft and the component rotate together.

SUMMARY OF THE INVENTION

One embodiment of the invention relates to a driveshaft mechanism. The driveshaft mechanism includes a non-metallic driveshaft. The non-metallic driveshaft includes a first end and a second end, an exterior surface, and an interior surface defining an interior cavity. The driveshaft mechanism also includes a driveshaft insert. The driveshaft insert has a first open end, an interior surface, at least one spline extending radially inwardly from the interior surface, and an exterior surface. A portion of the exterior surface of the driveshaft insert is adhered to the interior surface of the non-metallic driveshaft fixing the driveshaft insert relative to the non-metallic driveshaft such that they rotate together.

Another embodiment of the invention relates to a driveshaft insert. The driveshaft insert is to be coupled to a driveshaft including an interior surface defining an interior cavity. The driveshaft insert is configured to receive and engage a splined shaft of a yoke coupling the driveshaft to the yoke such that rotation of the driveshaft is transmitted to the yoke. The driveshaft insert includes a sidewall surrounding a longitudinal axis extending from a first end to a second open end. The sidewall includes an interior surface, an interior cavity, and an exterior surface. The interior surface includes a splined portion. The interior cavity is configured to receive the splined shaft of the yoke. The splined portion is configured to engage with the splined shaft of the yoke. The exterior surface of the sidewall includes a first portion extending from the first end to a first radially outwardly extending wall portion. The first portion is configured to be coupled to the interior surface of the driveshaft with the first radially outwardly extending wall portion configured to limit the axial movement of the driveshaft toward the second open end of the sidewall.

Another embodiment of the invention relates to a drive mechanism. The drive mechanism includes a non-metallic driveshaft. The non-metallic driveshaft includes a first end and a second end, an exterior surface, and an interior surface defining an interior cavity. The drive mechanism also includes a metallic driveshaft insert. The driveshaft insert includes a sidewall surrounding a longitudinal axis. The sidewall extends from a first end to a second open end. The sidewall includes an internal spline portion, an interior cavity, and an exterior surface. The exterior surface of the sidewall includes a first portion extending from the first end to a first radially outwardly extending wall portion. The first radially outwardly extending wall portion is configured to limit the axial movement of the driveshaft toward the second open end of the sidewall. The drive mechanism also includes a yoke. The yoke includes a splined shaft. The yoke is configured to couple to a universal joint such that the yoke and the universal joint rotate together. The drive mechanism also includes an adhesive between at least a portion of the first portion of the sidewall and the interior surface of the non-metallic driveshaft to attach the driveshaft insert to the non-metallic driveshaft. The interior cavity of the driveshaft insert receives the splined shaft of the yoke. The splined portion of the driveshaft insert engages the splined shaft of the yoke such that the non-metallic driveshaft, the driveshaft insert, and the yoke rotate together.

Another embodiment of the invention relates to a method of making a driveshaft mechanism. The method includes providing a non-metallic driveshaft having a first end and a second end, an exterior surface, and an interior surface defining an interior cavity. The method also includes providing a driveshaft insert. The driveshaft insert includes a sidewall surrounding a longitudinal axis. The sidewall includes an interior surface, an interior cavity, and an exterior surface. The interior surface includes a splined portion. The exterior surface includes a radially outwardly extending wall portion. The method also includes providing adhesive. The method also includes inserting at least a portion of the driveshaft insert into the interior cavity of the non-metallic driveshaft with the adhesive coupling at least a portion of the exterior surface of the driveshaft insert to the interior surface of the non-metallic driveshaft. The method also includes providing a yoke including a projecting splined shaft. The method also includes inserting at least a portion of the projecting splined shaft of the yoke into the interior cavity of the driveshaft insert with the splined shaft of the yoke engaging the splined portion of the interior surface of the driveshaft insert such that the yoke, the driveshaft insert, and the non-metallic driveshaft are configured to rotate together.

Another embodiment of the invention relates to a driveshaft mechanism. The driveshaft mechanism includes a non-metallic driveshaft extending from a first end to a second end, including an exterior surface, an interior surface, and an interior cavity defined by the interior surface. The driveshaft mechanism also includes a metallic driveshaft insert. The driveshaft insert includes a sidewall surrounding a longitudinal axis. The sidewall extends from a first end to a second open end. The sidewall includes an interior splined portion, an interior cavity, and a first surface extending from the first end of the sidewall to a radially outwardly extending wall portion. The driveshaft mechanism also includes a sleeve having an interior surface and an exterior surface. The interior surface of the driveshaft is adhered to the first surface of the driveshaft insert. The radially outwardly extending wall portion is configured to limit displacement of the driveshaft in the axial direction toward the second open end of the driveshaft insert. The interior surface of the sleeve is adhered to the exterior surface of the driveshaft. At least a portion of the splined portion of the sidewall of the driveshaft insert is located within the interior cavity of the driveshaft.

Various embodiments of the invention relate to a driveshaft mechanism. Other embodiments of the invention relate to a driveshaft insert. The embodiments include any combination of one or more features recited in the specification, claims and/or shown in the drawings. Alternative exemplary embodiments relate to other features and combinations of features as may be generally recited in the claims.

BRIEF DESCRIPTION OF THE DRAWINGS

This application will become more fully understood from the following detailed description, taken in conjunction with the accompanying figures, wherein like reference numerals refer to like elements in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
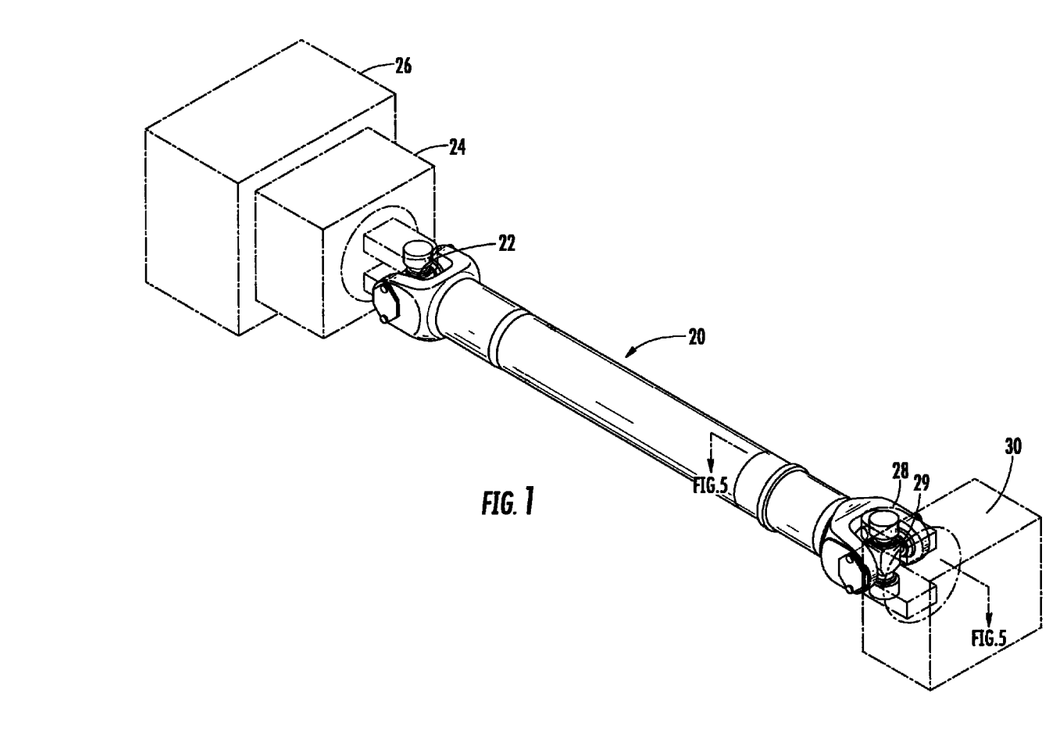
FIG. 1 is a schematic view of a drive mechanism including an exemplary driveshaft mechanism transmitting power from a transmission driven by an engine to an axle.

Referring to FIG. 1, an embodiment of a drive mechanism, including an embodiment of a driveshaft mechanism, for transmitting power is illustrated. Specifically the driveshaft mechanism includes a driveshaft and a driveshaft insert configured to interface with a component such that the component can rotate together with the driveshaft without the use of welding between the insert and the driveshaft.

FIG. 1 illustrates one embodiment of a driveshaft mechanism 20. The driveshaft mechanism 20 is coupled at a first end to a universal joint 22 such that the driveshaft mechanism 20 and the universal joint 22 rotate together. The universal joint 22 is coupled to a transmission 24 which is in turn coupled with a motor 26. Thus, power from the motor 26 can be supplied to rotate the driveshaft mechanism 20. The second end of the driveshaft mechanism 20 is coupled to a yoke 28 which is coupled with a second universal joint 29. The second universal joint 29 is coupled with an axle 30 such that the driveshaft mechanism 20, the yoke 28, the second universal joint 29 are configured to turn together to turn the axle 30. Thus, power from the motor 26 can be transmitted to the axle 30 to turn the axle 30.

While the driveshaft mechanism 20 is illustrated in FIG. 1 for use transmitting power from a motor 26 to an axle 30, this use and configuration are exemplary. Embodiments of driveshaft mechanisms may be used in various other suitable configurations and for various other suitable uses.

Figure 2:
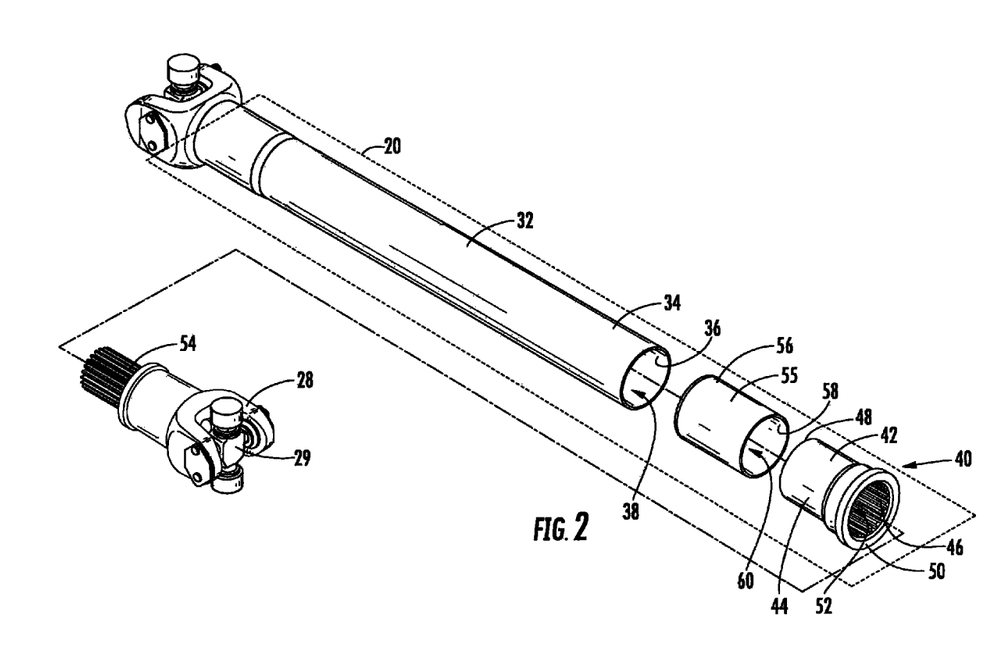
FIG. 2 is a perspective view of an embodiment of a driveshaft mechanism with one end exploded and a yoke to which the driveshaft mechanism is configured to be coupled.

With reference to FIG. 2, the driveshaft mechanism 20 is illustrated partially exploded. The driveshaft mechanism 20 includes a driveshaft 32. In one embodiment, the driveshaft 32 is a non-metallic driveshaft. The driveshaft 32 includes an outer surface 34, an interior surface 36, and an interior cavity 38 defined by the interior surface 36.

The driveshaft mechanism 20 also includes a driveshaft insert 40. In one embodiment, the driveshaft insert 40 is formed from a suitable metal by any suitable process (e.g., machining, injection molding, etc.). The driveshaft insert 40 includes a sidewall 42 with an exterior surface 44 and an interior surface 46. The sidewall 42 surrounds a longitudinal axis and extends from a first end, illustrated as a first open end 48, to a second open end 50, with the interior surface 46 of the driveshaft insert 40 defining a cavity 52. The driveshaft insert 40 includes a splined interior portion, illustrated as a splined interior surface 46 in FIG. 2. The driveshaft insert 40 is configured to receive a splined shaft 54 of the yoke 28 through the second open end 50 and into the interior cavity 52. The splined interior surface 46 of the driveshaft insert 40 engages the splined shaft 54 of the yoke 28 such that driveshaft insert 40 and the splined shaft 54 will rotate together when the splined shaft 54 is in the interior cavity 52.

The driveshaft mechanism 20 also includes a sleeve 55. The sleeve 55 includes an exterior surface 56 and an interior surface 58, with the interior surface 58 defining an interior cavity 60. The interior surface 58 engages both the exterior surface 34 of the driveshaft 32 and the exterior surface 44 of the driveshaft insert 40, as will be described further below.

Figure 3:
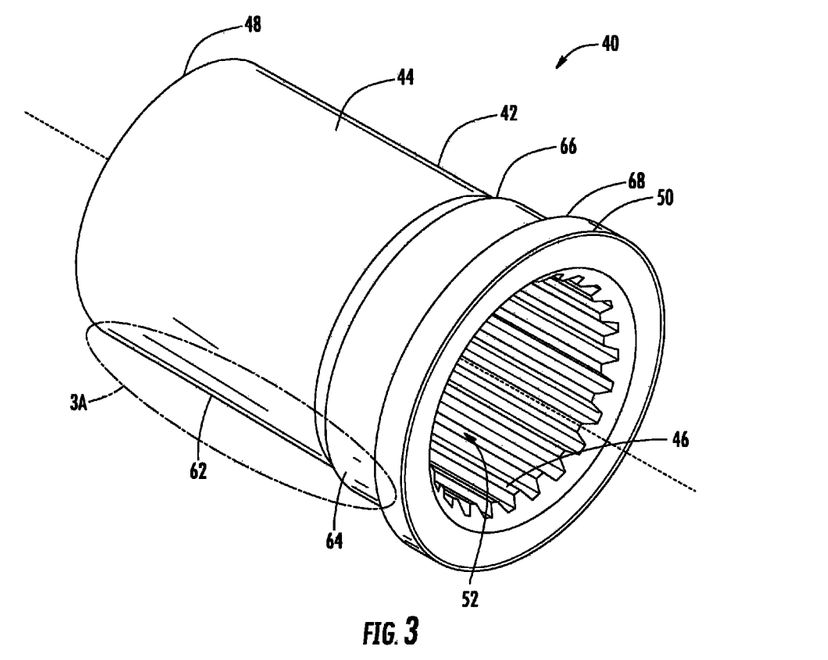
FIG. 3 is a perspective view of an embodiment of a driveshaft insert of the driveshaft mechanism of FIG. 2.

A driveshaft insert 40 is illustrated in FIG. 3. The sidewall 42 of the driveshaft insert 40 generally surrounds a longitudinal axis extending from the first open end 48 to the second open end 50. The sidewall 42 includes a first portion 62 extending axially from the first open end 48 to a second portion 64. The exterior surface of the second portion 64 is disposed farther radially outwardly from the longitudinal axis than the exterior surface of the first portion 62. The exterior surface 56 of the sidewall 42 includes a first radially outwardly extending wall portion 66 between the first portion 62 and the second portion 64.

The second portion 64 extends from the first radially outwardly extending wall portion 66 in the direction of the second open end 50 to a second radially outwardly extending wall portion 68.

Figure 3A:
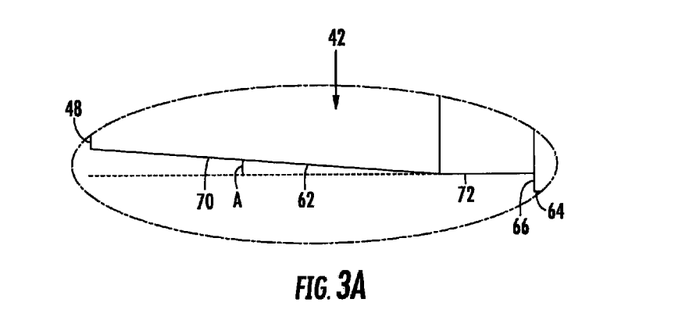
FIG. 3A is a detail view of the portion indicated at 3A in FIG. 3.

FIG. 3A is a detail view of the portion indicated at 3A in FIG. 3. The first portion 62 of the exterior surface of the sidewall 42 includes a first segment 70 extending from the first open end 48 to a second segment 72 that extends from the first segment 70 to the first radially outwardly extending wall portion 66. While the second segment 72 extends generally parallel with the longitudinal axis, the first segment 70 extends angularly from the second segment 72 at an angle A to the second segment 72 and to the longitudinal axis. In one embodiment, the angle A is between approximately 0.05 degrees and 0.50 degrees. In another embodiment the angle A is between approximately 0.10 degrees and 0.30 degrees. In another embodiment the angle is approximately 0.229 degrees.

Figure 4:
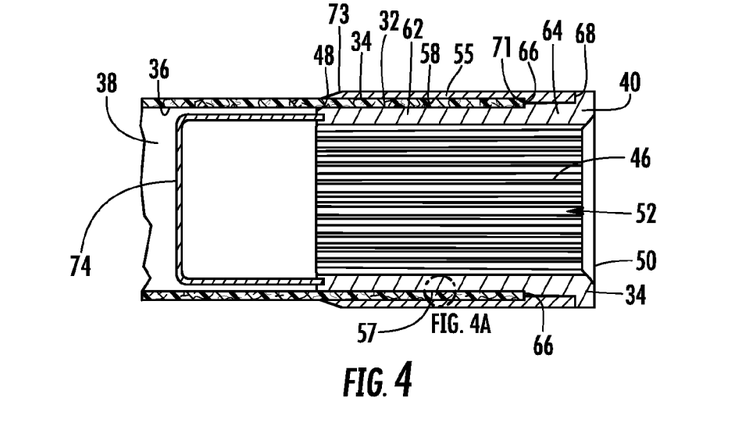
FIG. 4 is a cross-sectional assembled view of an embodiment of the driveshaft, driveshaft insert, and sleeve of the driveshaft mechanism of FIG. 2.
Figure 4A:
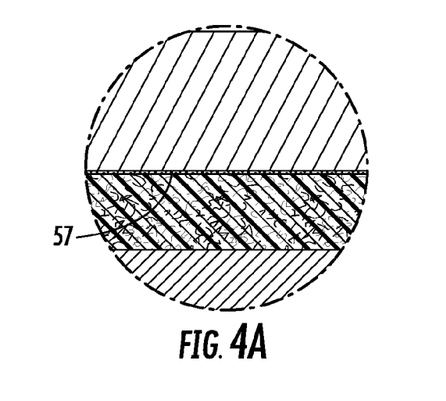
FIG. 4A is a detail view of the portion indicated at FIG. 4A in FIG. 4.

FIG. 4 illustrates the driveshaft 32, the driveshaft insert 40 and the sleeve 55 in an assembled configuration. The driveshaft insert 40 is inserted in the interior cavity 38 of the driveshaft 32. The interior surface 36 of the driveshaft 32 is coupled to (such as, for example, by adhering to or otherwise attaching to) the exterior surface 44 of the driveshaft insert 40. The interior surface 36 is positioned against the first portion 62 of the driveshaft insert 40 with the axial periphery of an end 71 of the driveshaft 32 contacting the first radially outwardly extending wall portion 66 of the driveshaft insert 40. In one embodiment, the exterior surface 34 of the driveshaft 32 is located farther radially outwardly than the radially outer surface of the second portion 64 of the driveshaft insert 40 with the driveshaft insert 40 disposed in the interior cavity 38 of the driveshaft 32. As illustrated in FIGS. 4 and 4A, in one embodiment adhesive 57, such as, for example, epoxy may be disposed on the radially outer surface of the first portion 62 of the driveshaft insert 40 to adhere the first portion 62 to the interior surface 36 of the driveshaft 32. In other embodiments other suitable adhesives such as, for example, glue, resin, etc. may be used to couple the first portion 62 to the interior surface 36 of the driveshaft 32. In one embodiment, the driveshaft insert 40 is coupled to the driveshaft 32 without welding.

The first radially outwardly extending wall portion 66 abuts the axial periphery of an end 71 of the driveshaft 32 and, thus, is configured to restrict the movement of the driveshaft 32 toward the second open end 50 of the driveshaft insert 40.

With further reference to FIG. 4, the interior surface 58 of the sleeve 55 is located against both the exterior surface 34 of the driveshaft 32 and the second portion 64 of the driveshaft insert 40. The sleeve 55 is sized, arranged, and configured to provide a radially inwardly directed compressive force on the driveshaft 32 toward the driveshaft insert 40. The sleeve 55 is coupled to (e.g., by adhering to with adhesive or otherwise attaching to) the driveshaft 32 and the driveshaft insert 40. The axial periphery of the sleeve 55 abuts the second radially outwardly extending wall portion 68 of the driveshaft insert 40. Thus, the second radially outwardly extending wall portion 68 is configured to restrict the movement of the sleeve 55 toward the second open end 50 of the driveshaft insert 40.

Adhesive, such as, for example, epoxy may be disposed on the second portion 64 of the driveshaft insert 40 and the exterior surface 34 of the driveshaft 32 to adhere the interior surface 58 of the sleeve 55 to the driveshaft 32 and the driveshaft insert 40. In other embodiments other suitable adhesives such as, for example, glue, resin, etc. may be used. In one embodiment, the sleeve 55 is coupled to the driveshaft insert 40 and the driveshaft 32 without welding. In another embodiment, the sleeve 55 provides an interference fit with the driveshaft 32 and the driveshaft insert 40 and is maintained in place without adhesive or welding.

The driveshaft insert 40 and the sleeve 55 are arranged and configured relative to the driveshaft 32 such that torque may be transferred both between the exterior surface 34 of the driveshaft 32 and the interior surface 58 of the sleeve 55, as well as between the interior surface 36 of the driveshaft 32 and the exterior surface 44 of the driveshaft insert 40. This may allow for uniform application of torque.

Figure 5:
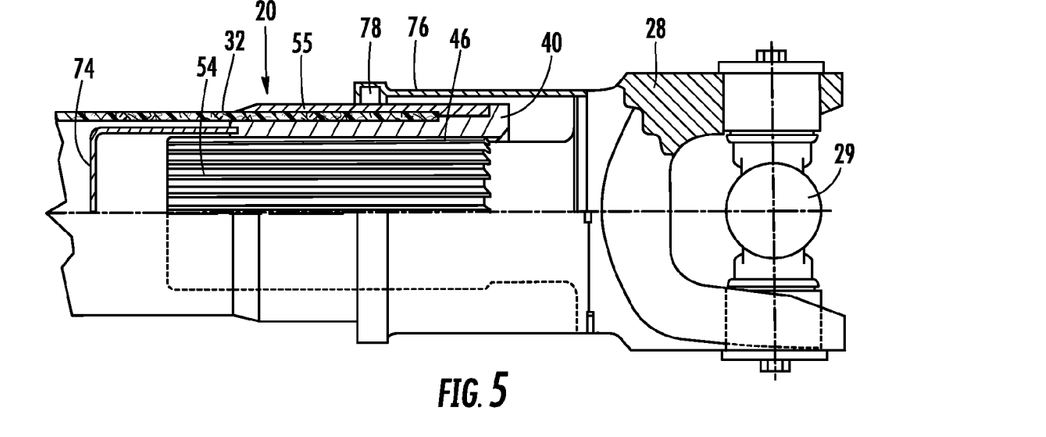
FIG. 5 is a partial cross-sectional view taken along the line FIG. 5-FIG. 5 of the driveshaft mechanism of FIG. 1, with the driveshaft mechanism receiving a splined shaft of a yoke.

With reference to FIGS. 4 and 5, in one embodiment the sleeve 55 includes a beveled axially peripheral edge 73. In other embodiments, the axial peripheral edge 73 may instead be unbeveled. Additionally, in other embodiments the axial peripheral edge 73 of the sleeve 55 extends axially past the first open end 48 of the driveshaft insert 40.

A grease plug 74 is also provided. The grease plug 74 extends from the first open end 48 of the driveshaft insert 40 into the interior cavity 38 of the driveshaft 32. The grease plug 74 seals the first open end 48 of the driveshaft insert 40 such that fluid, such as lubricating fluid, etc., is prevented from being released into the interior cavity 38 of the driveshaft 32 from the interior cavity 52 of the driveshaft insert 40. The grease plug 74 may be coupled with the driveshaft insert 40 by adhesive, welding, or any suitable mechanism. In one embodiment, the first open end 48 of the driveshaft insert 40 includes a channel defined in the axial periphery of its first open end 48 into which the side wall of the grease plug 74 may be received and in which the grease plug 74 may be coupled to the driveshaft insert 40. In another embodiment, the grease plug 74 and the driveshaft insert 40 may be unitarily formed.

FIG. 5 illustrates a partial cross-sectional view of an assembled portion of the driveshaft mechanism 20, including the driveshaft 32, the driveshaft insert 40, and the sleeve 55, taken along the line FIG. 5-FIG. 5 in FIG. 1, with the driveshaft mechanism 20 receiving the splined projection 54 of the yoke 28. The splines of the splined shaft 54 of the yoke 28 engage the splines of the interior surface 46 of the driveshaft insert 40. Thus, the driveshaft insert 40 and the splined shaft 54, and thus the driveshaft 32 and the yoke 28, are allowed to slide axially relative to one another, however, they are configured to rotate together, even while moving axially relative to one another.

In one embodiment, coupled to and extending from the yoke 28 proximate its radial outer periphery, a seal tube 76 is provided. The seal tube 76 surrounds a portion of the splined shaft 54 and extends to the sleeve 55 when the splined shaft 54 is located in the interior cavity 52 of the driveshaft insert 40. A seal, such as, for example, an O-ring 78, coupled with the seal tube 76 proximate the axial periphery distal from the yoke 28, contacts the sleeve 55 and seals the seal tube 76 with the driveshaft mechanism 20 preventing ingress of contaminants into the interior cavity 52 of the driveshaft insert 40 and egress of, for example, lubricant from the interior cavity 52 of the driveshaft insert 40, while the splined shaft 54 is located in the interior cavity of the driveshaft insert 40.

Figure 6:
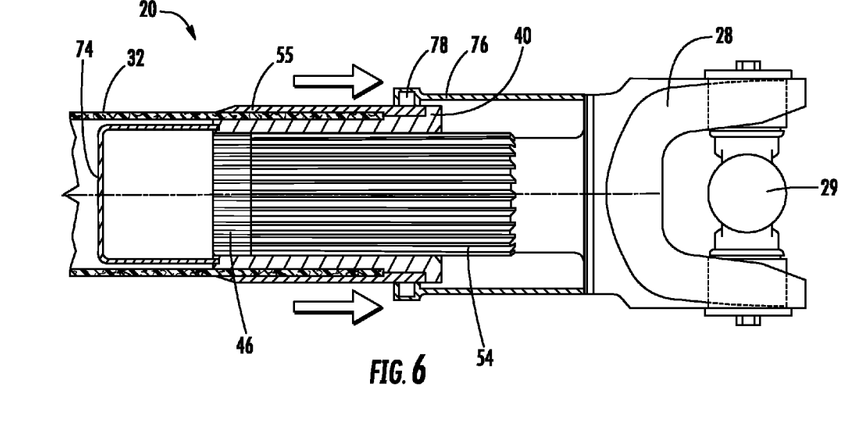
FIG. 6 is a partial cross-sectional view of the driveshaft mechanism of FIG. 5 receiving a splined shaft of a yoke, illustrating axial displacement of the splined shaft and yoke relative to the driveshaft mechanism.

With reference to FIG. 6, axial movement of the splined shaft 54, yoke 28, seal tube 76, O-ring 78, and universal joint 29 relative to the driveshaft mechanism 20 is illustrated. As illustrated, axial movement of the driveshaft mechanism 20 relative to the splined shaft 54, yoke 28, seal tube 76, O-ring 78, and universal joint 29 is possible while the splined shaft 54 and splined interior surface 46 of the driveshaft insert 40 remain engaged, and thus the yoke 28 and driveshaft 32 remain configured to rotate together.

The coupling of one end of the driveshaft mechanism 20 to a mechanism such as, for example, a universal joint is described above. In one embodiment, the opposite end of the driveshaft mechanism 20 may be coupled to another component, such as, for example, a universal joint, by any suitable mechanism (such as, for example, a mechanism that does not permit axial displacement of the opposite end of the driveshaft mechanism 20 relative to the universal joint, a yoke with a portion configured to couple to a driveshaft with an interference fit or to cut into the interior surface of the driveshaft, etc.). In another embodiment, the opposite end of the driveshaft mechanism may be coupled to another component, such as, for example, a universal joint, similarly to the end of the driveshaft mechanism described above, with the opposite end of the driveshaft mechanism including, a second driveshaft insert, a second sleeve, etc.

Additionally, in the illustrated embodiment, the one end of the driveshaft is coupled to the driveshaft insert which receives a splined projection of a yoke which is coupled to a universal joint, which in turn is coupled to an axle. In another embodiment, the one end of the driveshaft is coupled to a driveshaft insert which is configured to receive a splined projection of a yoke which is coupled to a universal joint, which in turn is coupled to a transmission, while the opposite end of the driveshaft is coupled to an axle by any suitable mechanism (such as, for example, a mechanism that does not permit axial displacement of the opposite end of the driveshaft mechanism 20 relative to the universal joint or axle, a yoke with a portion configured to couple to a driveshaft with an interference fit or to cut into the interior surface of the driveshaft, etc.).

In some embodiments, the driveshaft may be formed from fiberglass, carbon fiber, graphite, combinations thereof, or any other suitable material. In other embodiments, the driveshaft may be formed from any other suitable material, e.g., metal, composite, alloy, etc.

In some embodiments, the driveshaft insert 40 may be formed from aluminum, steel, other suitable metals, suitable metal alloys, plastic, other suitable non-metallic materials, or combinations thereof.

in one embodiment, the driveshaft insert 40 is machined. In other embodiments, the driveshaft insert 40 may be formed by metal injection molding, sintering, other types of molding, or any other suitable process.

In one embodiment, the end of the driveshaft insert 40 disposed within the cavity 38 of the driveshaft 32 may be a closed end.

With reference to FIG. 4, in one embodiment, the sleeve 55 and the driveshaft insert 40 may be integrally formed as a single, unitary piece.

In some embodiments, the interior surface 46 of the driveshaft insert 40 may include any suitable number of shape of, and pattern of splines. Alternatively, other apparatus to engage the yoke 28 such that the driveshaft insert 40 and the yoke 28 rotate together may be provided.

With reference to FIGS. 3 and 3A, in one embodiment, the first portion 62 extends from the first open end 48 to the first radially outwardly extending wall portion 66 an axial length of between approximately 1 inch and 12 inches. In another embodiment, the first portion 62 extends from the first open end 48 to the first radially outwardly extending wall portion 66 an axial length of between approximately 3 inches and 5 inches. In another embodiment, the first portion 62 extends from the first open end 48 to the first radially outwardly extending wail portion 66 an axial length of approximately 4 inches.

With reference to FIG. 3A, in one embodiment, the first segment 70 extends an axial length of between approximately 1 inch and 10 inches. In another embodiment, the first segment 70 extends an axial length of between approximately 3 inches and 4 inches. In another embodiment, the first segment 70 extends an axial length of approximately 3.75 inches. In one embodiment, the second segment 72 extends an axial length of between approximately 0.1 inches and 3 inches. In another embodiment, the second segment 72 extends an axial length of between approximately 0.2 inches and 0.5 inches. In another embodiment, the second segment extends an axial length of approximately 0.25 inches.

With reference to FIG. 3, in one embodiment, the second portion 64 extends between approximately 0.5 inches and 4 inches. In another embodiment, the second portion 64 extends approximately 1 inch.

With further reference to FIG. 3, in one embodiment, the driveshaft insert 40 has an axial length measured from the periphery of the first open end 48 to the periphery of the second open end 50 of between approximately 1 inch and 15 inches. In another embodiment, the driveshaft insert 40 has an axial length measured from the periphery of the first open end 48 to the periphery of the second open end 50 of between approximately 4 inches and 6 inches. In another embodiment, the driveshaft insert 40 has an axial length measured from the periphery of the first open end 48 to the periphery of the second open end 50 of approximately 5.38 inches.

With further reference to FIG. 3, in one embodiment, the interior cavity 52 of the driveshaft insert 40 has a diameter measured from the radially interior periphery of the radially inwardly extending splines of between approximately 1 inch and 10 inches. In another embodiment, the interior cavity 52 of the driveshaft insert 40 has a diameter measured from the radially interior periphery of the radially inwardly extending splines of between approximately 2.720 and 2.725 inches.

In one embodiment, the sidewall 42 of the driveshaft insert 40 has an exterior diameter measured at the first open end 48 of between approximately 1 inch and 12 inches. In another embodiment, the sidewall 42 of the driveshaft insert 40 has an exterior diameter measured at the first open end 48 of between 3.4 inches and 3.5 inches. In another embodiment, the sidewall 42 of the driveshaft insert 40 has an exterior diameter measured at the first open end 48 of between 3.464 inches and 3.468 inches.

With further reference to FIG. 3, in one embodiment, the second portion 64 of the sidewall 42 has an exterior diameter measured at its radial outer periphery of between 1 inch and 14 inches. In another embodiment, the second portion 64 of the sidewall 42 has an exterior diameter measured at is radial outer periphery of between 3.683 inches and 3.687 inches.

In one embodiment the second radially outwardly extending wall portion 68 has an exterior diameter measured at its radial outer periphery of between approximately 1 inches and 16 inches. In another embodiment the second radially outwardly extending wall portion 68 has an outer diameter measured at its radial outer periphery of approximately 4.15 inches.

In one embodiment, with the driveshaft insert 40 and splined shaft 54 of the yoke 28 disposed within the interior cavity 38 of the driveshaft 32, the driveshaft 32 itself provides support against any radially outwardly directed forces, along with the driveshaft insert 40 and the sleeve 55, for example, radially outwardly directed forces that may result from rotation of the driveshaft mechanism 20, the yoke 28, and the universal joint 29. In one embodiment, at least a portion of the splined portion of the sidewall of the driveshaft insert 40 is located within the interior cavity 38 of the driveshaft 32.

With reference to FIG. 4, in another embodiment, adhesive, such as, for example, epoxy may be disposed on the interior surface 36 of the driveshaft 32 to couple the first portion 62 of the driveshaft insert 40 to the driveshaft 32.

With further reference to FIG. 4, in another embodiment, adhesive, such as, for example, epoxy may be disposed on the interior surface 58 of the sleeve 55 to couple the second portion 64 of the driveshaft insert 40 and the exterior surface 34 of the driveshaft 32 to the sleeve 55.

In one embodiment, the sleeve 55 is adhered or otherwise attached to the driveshaft 32, but is not adhered to or otherwise attached to the driveshaft insert 40, but contacts the second portion 64 of the driveshaft insert 40. In another embodiment, the sleeve 55 is adhered or otherwise attached to the second portion 64 of the driveshaft insert 40, but is not adhered to or otherwise attached to the driveshaft 32, but contacts the exterior surface 34 of the driveshaft 32. In another embodiment, the sleeve 55 is adhered or otherwise attached to both the exterior surface 34 of the driveshaft 32 and the second portion 64 of the driveshaft insert 40.

In one embodiment, the splined shaft 54 includes a lubricant reservoir which allows for release of lubrication into the interior cavity 52 of the driveshaft insert 40.

In one embodiment, the interior surface 46 of the driveshaft insert 40 may be splined over the entire interior surface 46. In other embodiments, the interior surface 46 of the driveshaft insert 40 may be splined over less than the entire interior surface 46, including over any suitable portion of the interior surface 46. In one embodiment, the driveshaft insert projects at least approximately 3.5 inches past the first end of the non-metallic driveshaft into the interior of the non-metallic driveshaft.

In the illustrated embodiment, the driveshaft insert 40 is illustrated as being configured to couple with a yoke 28. In other embodiments, the driveshaft insert 40 may instead couple with any mechanism suitable to couple with the driveshaft insert 40, such that the mechanism and the driveshaft insert 40 rotate together, with the mechanism also being configured to couple with an additional part, e.g., axle, transmission, etc., to be coupled to the driveshaft such that the additional part and the driveshaft rotate together.

In one embodiment, the splined projection 54 of the yoke 28 is unitarily formed with the yoke 28. In another embodiment, the splined projection 54 is separately formed and attached to the yoke 28 by, e.g., welding, or any other suitable mechanism.

The radially outwardly extending wall portions of the driveshaft insert 40 are illustrated in the figures as extending outwardly generally perpendicular to the longitudinal axis. In other embodiments, the radially outwardly extending wall portions may extend at any suitable angle relative to the longitudinal axis.

Embodiments of the driveshaft mechanism and driveshaft insert described herein may allow for a driveshaft to be configured to rotate with another component, such as, for example, a universal joint, without welding. Additionally, embodiments of the driveshaft mechanism and driveshaft insert described herein may allow for a driveshaft to be configured to rotate with another component, such as, for example, a universal joint, with use of embodiments of the driveshaft insert and a sleeve, and without the need for additional coupling components to interface a driveshaft with another component such that the driveshaft and the other component rotate together. Additionally, embodiments of the driveshaft mechanism and driveshaft insert described herein may provide low weight rotational coupling between a driveshaft and another component, such as, for example, a universal joint.

Further modifications and alternative embodiments of various aspects of the invention will be apparent to those skilled in the art in view of this description. Accordingly, this description is to be construed as illustrative only. The construction and arrangements, shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

For purposes of this disclosure, the term "coupled" means the joining of two components directly or indirectly to one another. Such joining may be stationary in nature or movable in nature. Such joining may be achieved with the two members and any additional intermediate members being integrally formed as a single unitary body with one another or with the two members or the two members and any additional member being attached to one another. Such joining may be permanent in nature or alternatively may be removable or releasable in nature.

What is claimed is:

1. A driveshaft mechanism comprising:
   a non-metallic driveshaft having a first end and a second end, an exterior surface, and an interior surface defining an interior cavity;
   a driveshaft insert having a first open end, an interior surface, at least one spline extending radially inwardly from the interior surface, and an exterior surface;
   wherein a portion of the exterior surface of the driveshaft insert is adhered to the interior surface of the non-metallic driveshaft fixing the driveshaft insert relative to the non-metallic driveshaft such that they rotate together;
   wherein the driveshaft insert comprises a sidewall surrounding a longitudinal axis;
   wherein the driveshaft insert defines a second open end;
   wherein the driveshaft insert includes a first portion extending from the first open end to a first radially outwardly extending wall portion; and
   wherein the first radially outwardly extending wall portion is configured to limit axial displacement of the non-metallic driveshaft toward the second open end.

2. The driveshaft mechanism of claim 1, further comprising adhesive disposed between the first portion of the driveshaft insert and the non-metallic driveshaft coupling the driveshaft insert to the non-metallic driveshaft.

3. The driveshaft mechanism of claim 1, wherein the first portion of the driveshaft insert includes an outer surface; and
   wherein the outer surface of the first portion includes an angled portion that is angled toward the longitudinal axis in the direction of the first open end of the driveshaft insert.

4. The driveshaft mechanism of claim 1, wherein the driveshaft insert comprises a second portion extending radially farther outwardly than the first portion, the second portion extending axially from the first radially outwardly extending wall portion toward the second open end of the driveshaft insert.

5. The driveshaft mechanism of claim 4, further comprising a sleeve having an interior surface engaging both the second portion of the driveshaft insert and the exterior surface of the non-metallic driveshaft.

6. The driveshaft mechanism of claim 5 wherein the sleeve is configured to provide a radially inwardly-directed force against the non-metallic driveshaft toward the driveshaft insert.

7. The driveshaft mechanism of claim 1, wherein the driveshaft insert projects at least approximately 3.5 inches past the first end of the non-metallic driveshaft into the interior of the non-metallic driveshaft.

8. The driveshaft mechanism of claim 1, wherein at least an axially extending segment of an exterior surface of the first portion of the driveshaft insert is non-parallel with the longitudinal axis.

9. The driveshaft mechanism of claim 8,
   wherein the at least an axially extending segment of the exterior surface of the first portion tapers toward the longitudinal axis extending toward the first open end of the driveshaft insert at an angle of between approximately 0.20 degrees and 0.25 degrees relative to the longitudinal axis.

10. A drive mechanism comprising:
    a non-metallic driveshaft having a first end and a second end, an exterior surface, and an interior surface defining an interior cavity;
    a metallic driveshaft insert including a sidewall surrounding a longitudinal axis, the sidewall extending from a first end to a second open end, the sidewall including an internal spline portion, an interior cavity, and an exterior surface, the exterior surface of the sidewall including a first portion extending from the first end to a first radially outwardly extending wall portion, the first radially outwardly extending wall portion being configured to limit the axial movement of the driveshaft toward the second open end of the sidewall;
    a yoke including a splined shaft, the yoke configured to couple to a universal joint such that the yoke and the universal joint rotate together; and
    an adhesive between at least a portion of the first portion of the sidewall and the interior surface of the non-metallic driveshaft to attach the driveshaft insert to the non-metallic driveshaft;

wherein the interior cavity of the driveshaft insert receives the splined shaft of the yoke, the splined portion of the driveshaft insert engages the splined shaft of the yoke such that the non-metallic driveshaft, the driveshaft insert, and the yoke rotate together.

11. A method of making a driveshaft mechanism comprising:
providing a non-metallic driveshaft having a first end and a second end, an exterior surface, and an interior surface defining an interior cavity;
providing a driveshaft insert including a sidewall surrounding a longitudinal axis, the sidewall including an interior surface, an interior cavity, and an exterior surface, the interior surface including a splined portion, the exterior surface including a radially outwardly extending wall portion;
providing adhesive;
inserting at least a portion of the driveshaft insert into the interior cavity of the non-metallic driveshaft with the adhesive coupling at least a portion of the exterior surface of the driveshaft insert to the interior surface of the non-metallic driveshaft;
providing a yoke including a projecting splined shaft;
inserting at least a portion of the projecting splined shaft of the yoke into the interior cavity of the driveshaft insert with the splined shaft of the yoke engaging the splined portion of the interior surface of the driveshaft insert such that the yoke, the driveshaft insert, and the non-metallic driveshaft are configured to rotate together.

12. A driveshaft mechanism comprising:
a non-metallic driveshaft extending from a first end to a second end, including an exterior surface, an interior surface, and an interior cavity defined by the interior surface;
a metallic driveshaft insert including a sidewall surrounding a longitudinal axis, the sidewall extending from a first end to a second open end, the sidewall including an interior splined portion, an interior cavity, and a first surface extending from the first end of the sidewall to a radially outwardly extending wall portion, and a sleeve having an interior surface and an exterior surface;
wherein the interior surface of the driveshaft is adhered to the first surface of the driveshaft insert;
wherein the radially outwardly extending wall portion is configured to limit displacement of the driveshaft in the axial direction toward the second open end of the driveshaft insert;
wherein the interior surface of the sleeve is adhered to the exterior surface of the driveshaft; and
wherein at least a portion of the splined portion of the sidewall of the driveshaft insert is located within the interior cavity of the driveshaft.

13. The driveshaft mechanism of claim 12, wherein the driveshaft insert and the sleeve are non-unitary and separately formed; and
wherein the driveshaft insert and the sleeve are attached to one another.

* * * * *